(12) United States Patent
Cho et al.

(10) Patent No.: US 10,611,263 B2
(45) Date of Patent: Apr. 7, 2020

(54) WIRELESS POWER SUPPLY APPARATUS

(71) Applicant: Korea Advanced Institute of Science and Technology, Daejeon (KR)

(72) Inventors: Dong-ho Cho, Seoul (KR); Gu-ho Jung, Daejeon (KR); Bo-yune Song, Daejeon (KR); Seung-yong Shin, Daejeon (KR); Chung-hee Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 402 days.

(21) Appl. No.: 15/505,143

(22) PCT Filed: Jul. 8, 2015

(86) PCT No.: PCT/KR2015/007035
§ 371 (c)(1),
(2) Date: Feb. 20, 2017

(87) PCT Pub. No.: WO2016/027982
PCT Pub. Date: Feb. 25, 2016

(65) Prior Publication Data
US 2017/0274779 A1    Sep. 28, 2017

(30) Foreign Application Priority Data

Aug. 21, 2014    (KR) .................. 10-2014-0109235

(51) Int. Cl.
*H02J 7/00*     (2006.01)
*H02J 7/02*     (2016.01)
(Continued)

(52) U.S. Cl.
CPC .............. *B60L 50/50* (2019.02); *B60L 53/12* (2019.02); *H01F 38/14* (2013.01); *H02J 7/0042* (2013.01);
(Continued)

(58) Field of Classification Search
None
See application file for complete search history.

(56) References Cited

U.S. PATENT DOCUMENTS 9,656,562 B2 *    5/2017    Jeon .................. B60L 5/005
2013/0020161 A1 *    1/2013    Suh .................. B60L 5/005
                                    191/10

(Continued)

FOREIGN PATENT DOCUMENTS

JP    2014-011332    1/2014
KR    10-2012-0016521    2/2012
(Continued)

*Primary Examiner* — Jared Fureman
*Assistant Examiner* — James P Evans
(74) *Attorney, Agent, or Firm* — Lex IP Meister, PLLC

(57) ABSTRACT

An embodiment of the present invention relates to a wireless power supply apparatus, which has a power pickup core formed to wrap a corner of a power pickup cable to increase an inductive electromotive force induced in a power pickup unit, has a power feeding unit configured to transfer a magnetic flux by only a power feeding cable without a power feeding core, to reduce the enormous cost for materials required to fabricate the power feeding core and thus enhance the price competitiveness, and reduce the weight and volume thereof and thus simplify the installation thereof, and has the power pickup core configured to include a plurality of power pickup core members, to reduce the weight and volume of the power pickup unit and thus increase the operational efficiency of the vehicle under which the power pickup unit is mounted.

14 Claims, 13 Drawing Sheets

(51) Int. Cl.
  *B60L 53/12*   (2019.01)
  *B60L 50/50*   (2019.01)
  *H02J 50/10*   (2016.01)
  *H01F 38/14*   (2006.01)

(52) U.S. Cl.
  CPC .............. *H02J 7/025* (2013.01); *H02J 50/10* (2016.02); *B60Y 2200/91* (2013.01)

(56) References Cited

U.S. PATENT DOCUMENTS

| | | | | |
|---|---|---|---|---|
| 2014/0217830 A1* | 8/2014 | Jeon | ........................ | B60L 5/005 307/104 |
| 2015/0035481 A1* | 2/2015 | Cho | ...................... | B60L 11/182 320/108 |
| 2015/0137590 A1* | 5/2015 | Ichikawa | ................ | H01F 38/14 307/9.1 |

FOREIGN PATENT DOCUMENTS

| | | |
|---|---|---|
| KR | 10-2012-0116622 | 10/2012 |
| KR | 10-2014-0025355 | 3/2014 |

\* cited by examiner

WIRELESS POWER SUPPLY APPARATUS

TECHNICAL FIELD

An embodiment of the present invention relates to a wireless power supply apparatus.

BACKGROUND ART

The contents described in the part simply provide background information on the embodiments of the present invention but do not constitute the related art.

In general, an electric vehicle refers to a vehicle that uses electricity as a power source for driving the vehicle, and in order to drive the electric vehicle, a battery mounted on the electric vehicle is charged so that the electric vehicle is driven by the charged electric power. However, when a person or a machine that assists charging directly connects a charging electric wire to the vehicle to electrically charge the vehicle, such process is inconvenient and a user may be electrically shocked in the process of connecting the electric wire to the electric vehicle while gripping a plug with a hand. In this way, the method of charging the battery of the electric vehicle by using the charging electric wire causes inconvenience and an electric shock to the user, studies and developments of wireless power supply apparatuses that may charge a battery of an electric vehicle wirelessly have recently been actively made.

DISCLOSURE

Technical Problem

An embodiment of the present invention relates to a wireless power supply apparatus that may increase an inductive electromotive force induced in a power pickup unit, reduce core loss and increase power efficiency by forming a power pickup unit such that the power pickup core surrounds corners of a power pickup cable, may reduce enormous material costs consumed to manufacture the power pickup core by constituting a power feeding unit such that magnetic fluxes may be delivered only by a power feeding cable without using a power feeding core, thereby increasing price competitiveness, reducing weight and volume, and making it convenient to install the wireless power supply apparatus, and may increase driving efficiency of the vehicle, under which the power pickup unit is mounted, by constituting the power pickup unit such that the power pickup unit includes a plurality of power pickup cores and reducing the weight and volume of a power pickup unit.

Technical Solution

According to an embodiment of the present invention, a wireless power supply apparatus for wirelessly supplying electric power to a vehicle may include: a power pickup cable including a pair of first members spaced apart from each other in a first direction and a pair of second members connecting opposite ends of the first members; and a power pickup core part including a pair of power pickup core disposed along a second direction that is perpendicular to the first direction to surround the pair of first members, respectively, and the power pickup core part may include a power pickup unit surrounding at least one connecting portion formed by the pair of first members and the pair of second members.

Each of the power pickup cores includes a plurality of power pickup core members arranged in a row.

The wireless power supply apparatus may further include: a power feeding unit spaced apart from a lower side of the power pickup unit to provide a magnetic flux to the power pickup unit.

The power feeding unit may include a power feeding cable and delivers a magnetic flux without using a power feeding core.

At least one of the power pickup core members may surround the corresponding first member, and the other of the power pickup core members may surround the connecting portion.

The other of the power pickup core members may surround the corresponding first member and one end thereof may extend in the second direction to surround the connecting portion.

The other of the power pickup core members may surround the connecting portion from the top.

The other of the power pickup core members may extend from the top of the connecting portion.

The other of the power pickup core members may surround at least one of sides of the connecting portion in the second direction.

Each of the power pickup core members may include a holding end extending from at least one of directions that are perpendicular to an extension direction of the power pickup core member at opposite ends of the power pickup core member.

The holding ends provided in the power pickup core members of the pair of power pickup cores may be spaced apart from each other by a predetermined distance.

The power pickup core part may include a plurality of power pickup cables.

The power feeding unit may include: a pair of power feeding core parts in which a plurality of bar-shaped power feeding cores are arranged in a predetermined direction and which are disposed in parallel to be spaced apart from each other by a predetermined width; and a feeding cable disposed in the power feeding core parts.

The power feeding unit may include: a pair of power feeding core parts in which a plurality of bar-shaped power feeding cores are arranged in a predetermined direction and which are disposed in parallel to be spaced apart from each other by a predetermined width; and a feeding cable disposed in the power feeding core parts, and each of the power feeding cores may include a horizontal member disposed parallel to a plane formed by the power feeding core parts and a vertical member extending in a direction that is perpendicular to the horizontal member to have an L shape.

[Advantageous Effects]

According to an embodiment of the present invention, core loss may be reduced by forming the power pickup core such that the power pickup core surrounds the corners of the power pickup cable, and accordingly, an inductive electromotive force induced in the power pickup unit may be increased.

Further, price competitiveness may be increased by reducing enormous material costs consumed to manufacture the power feeding core, and the wireless power supply apparatus may be conveniently installed by reducing the weight and volume of the wireless power supply apparatus.

In addition, the driving efficiency of the vehicle, on which the power pickup unit is mounted, may be increased by reducing the weight and volume of the power pickup unit.

DESCRIPTION OF THE INVENTION

BEST MODE

Figure 1:
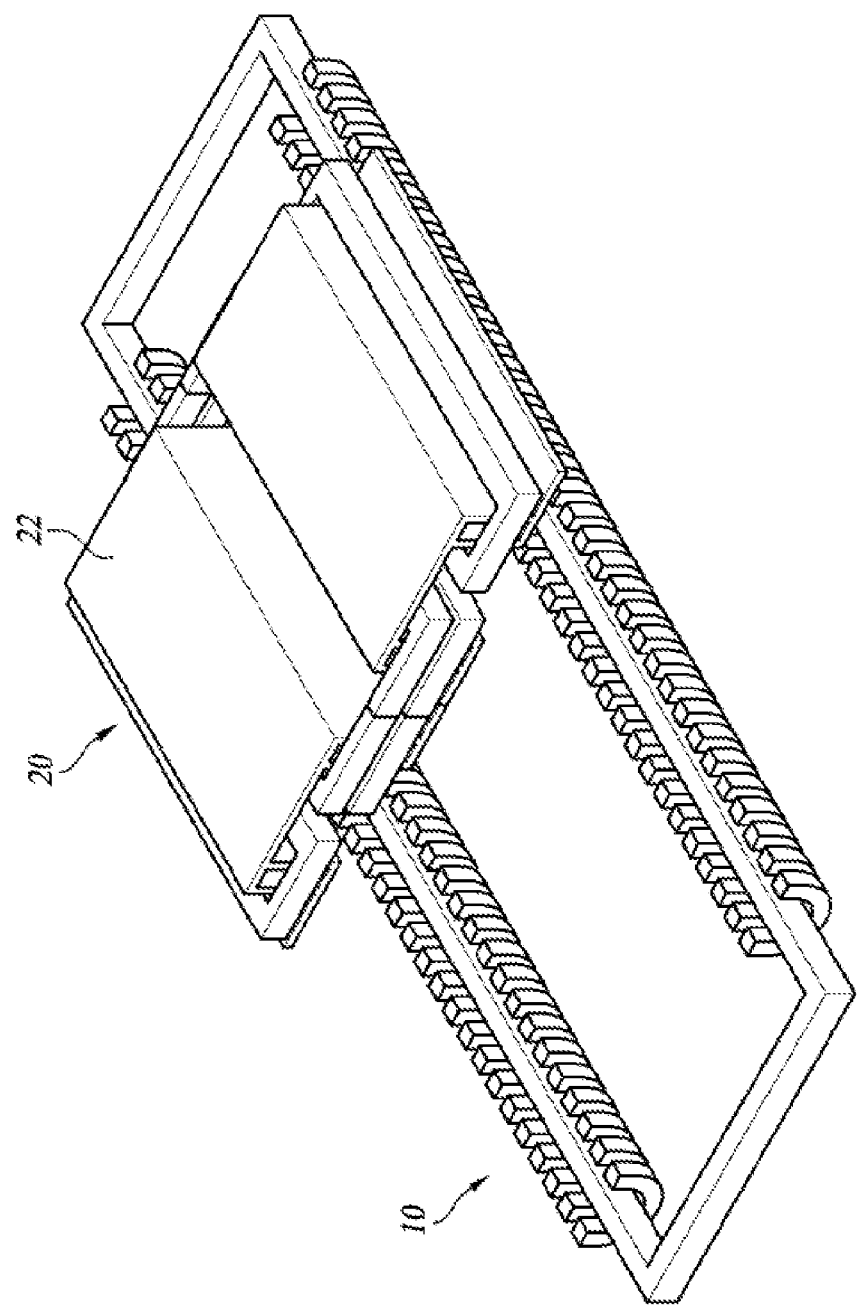
FIG. 1 is a view illustrating a wireless power supply apparatus according to an embodiment of the present invention.

Hereinafter, the present invention will be described in detail with reference to the accompanying drawings.

With regard to the reference numerals for the elements of the drawings, it is noted that the same elements have the same reference numerals even though they are illustrated in different drawings. Further, in a description of the present invention, detailed descriptions of the known configurations and known functions may be omitted when they may make the essence of the present invention unclear.

Further, in a description of the elements of the present invention, the terms such as first, second, A, B, (a), and (b) may be used. However, the terms are used to distinguish one element from another element, but do not limit the essence, the sequence, or order of the element. When it is described that one element is "connected" or "coupled" to another element, the first element may be directly connected to the second element, but the first element may be connected to the second element while a third element may be present between the first and second elements.

In general, a wireless power supply apparatus uses a method in which magnetic fluxes are formed by supplying high frequency power and an inductive electromotive force generated by a change of the magnetic fluxes is used.

Figure 2:
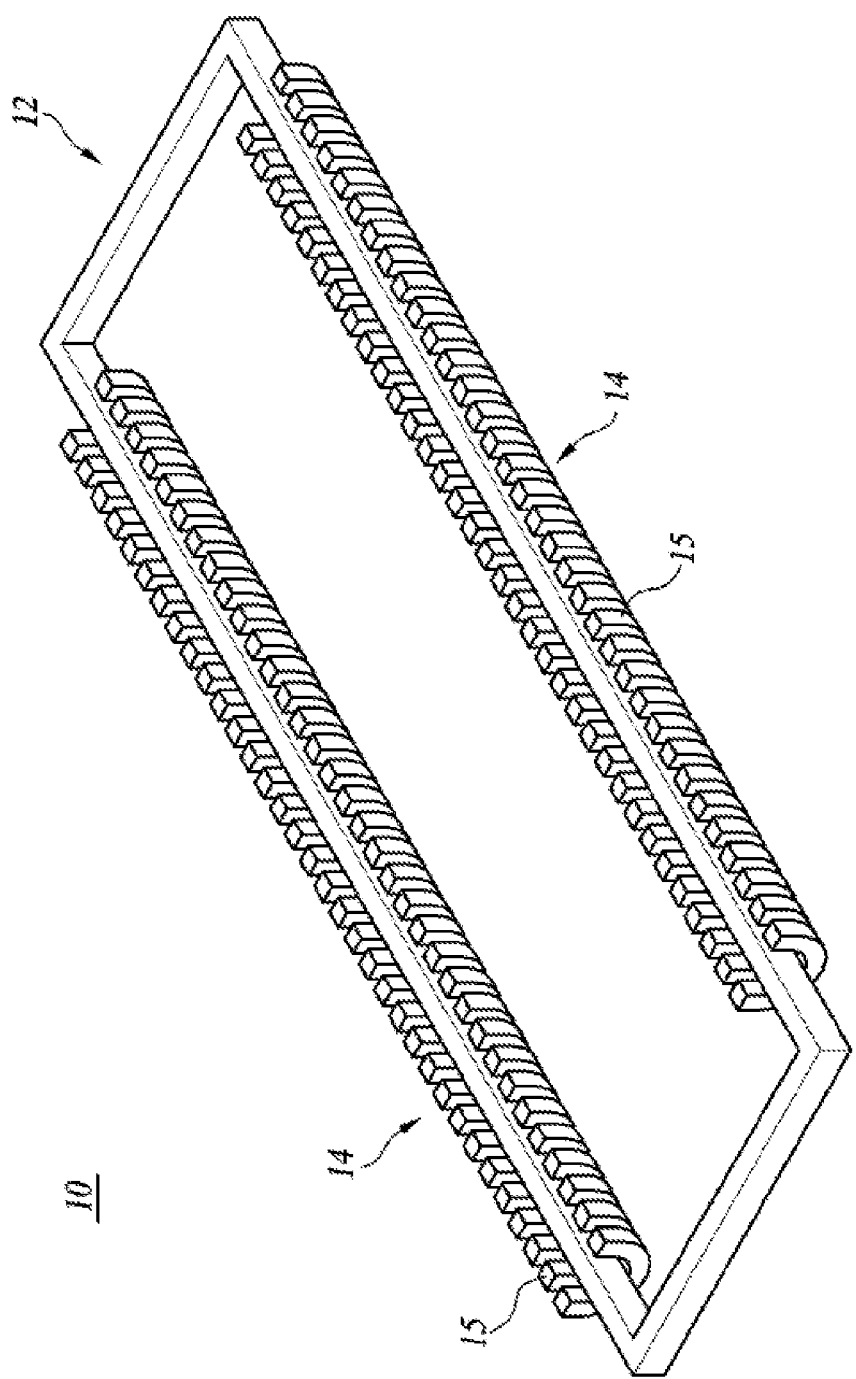
FIG. 2 is a view illustrating a power feeding unit of the wireless power supply apparatus according to the embodiment of the present invention.

FIGS. 1 and 2 are views illustrating a wireless power supply apparatus according to an embodiment of the present invention. The wireless power supply apparatus according to the embodiment of the present invention includes a power feeding unit 10 and a power pickup unit 20. The power feeding unit 10 includes a power feeding cable 12 and a power feeding core part 14 including a plurality of power feeding core parts 15, and accordingly, a large amount of a core material is consumed so that enormous manufacturing costs are necessary.

Further, when the power pickup unit 20 including an E-shaped power pickup core 22 is mounted under a vehicle, the total weight of the vehicle considerably increases due to the weight of the power pickup unit 20, decreasing a driving efficiency of the vehicle.

Figure 3:
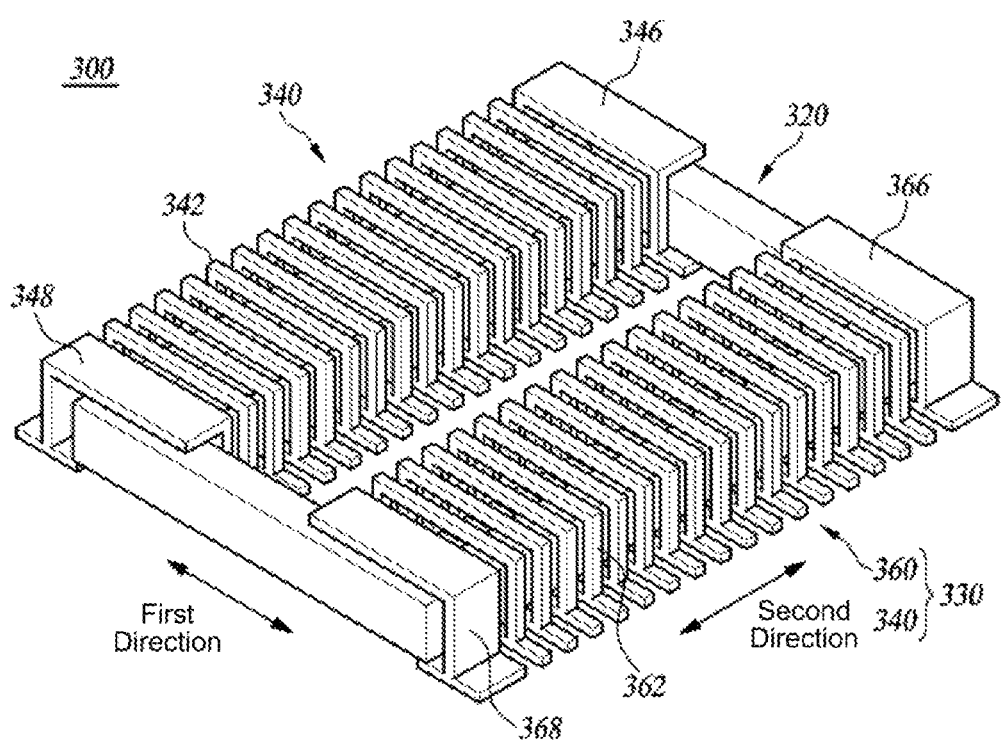
FIG. 3 is a perspective view illustrating a power pickup unit of the wireless power supply apparatus according to the embodiment of the present invention.
Figure 4:
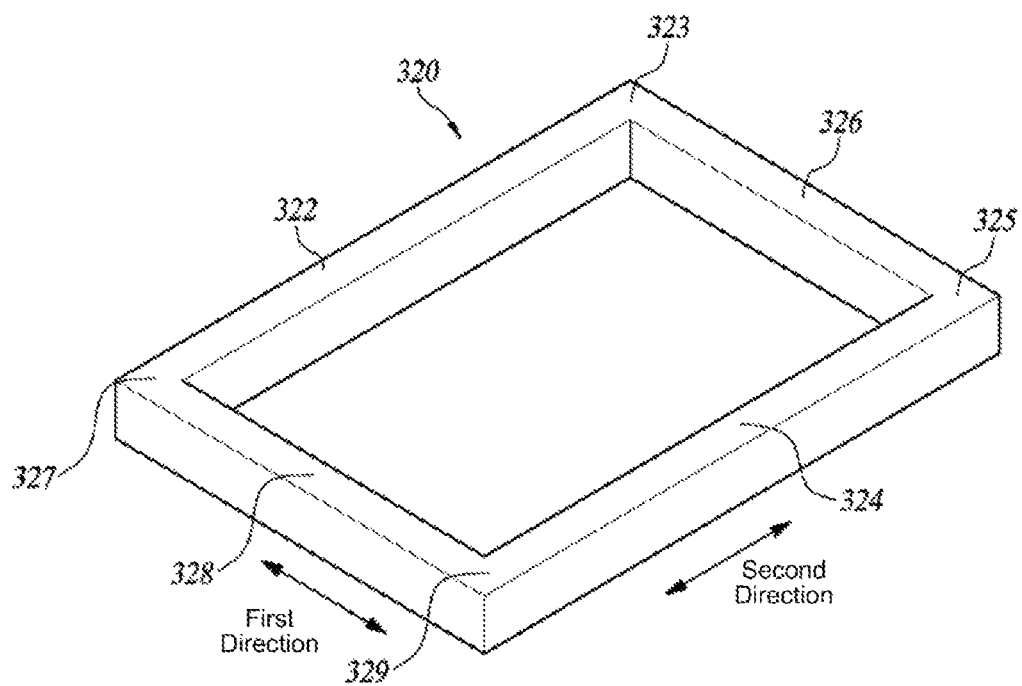
FIG. 4 is a perspective view illustrating a power pickup cable of the wireless power supply apparatus according to the embodiment of the present invention.
Figure 5:
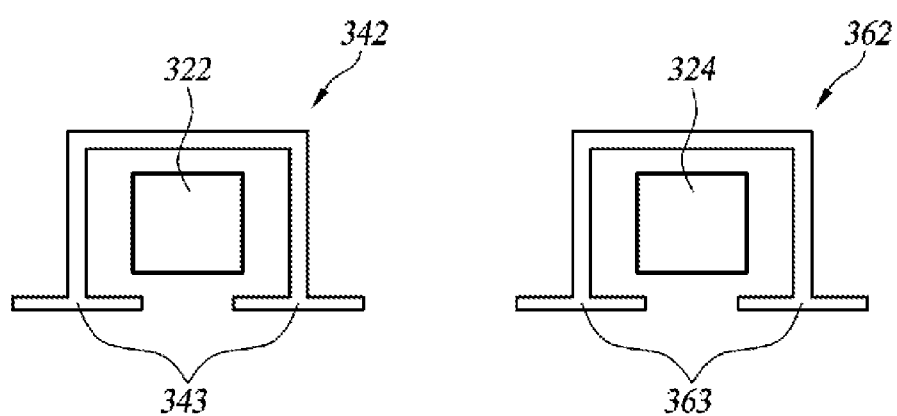
FIG. 5 is a view illustrating power pickup core members of the wireless power supply apparatus according to the embodiment of the present invention in detail.
Figure 6:
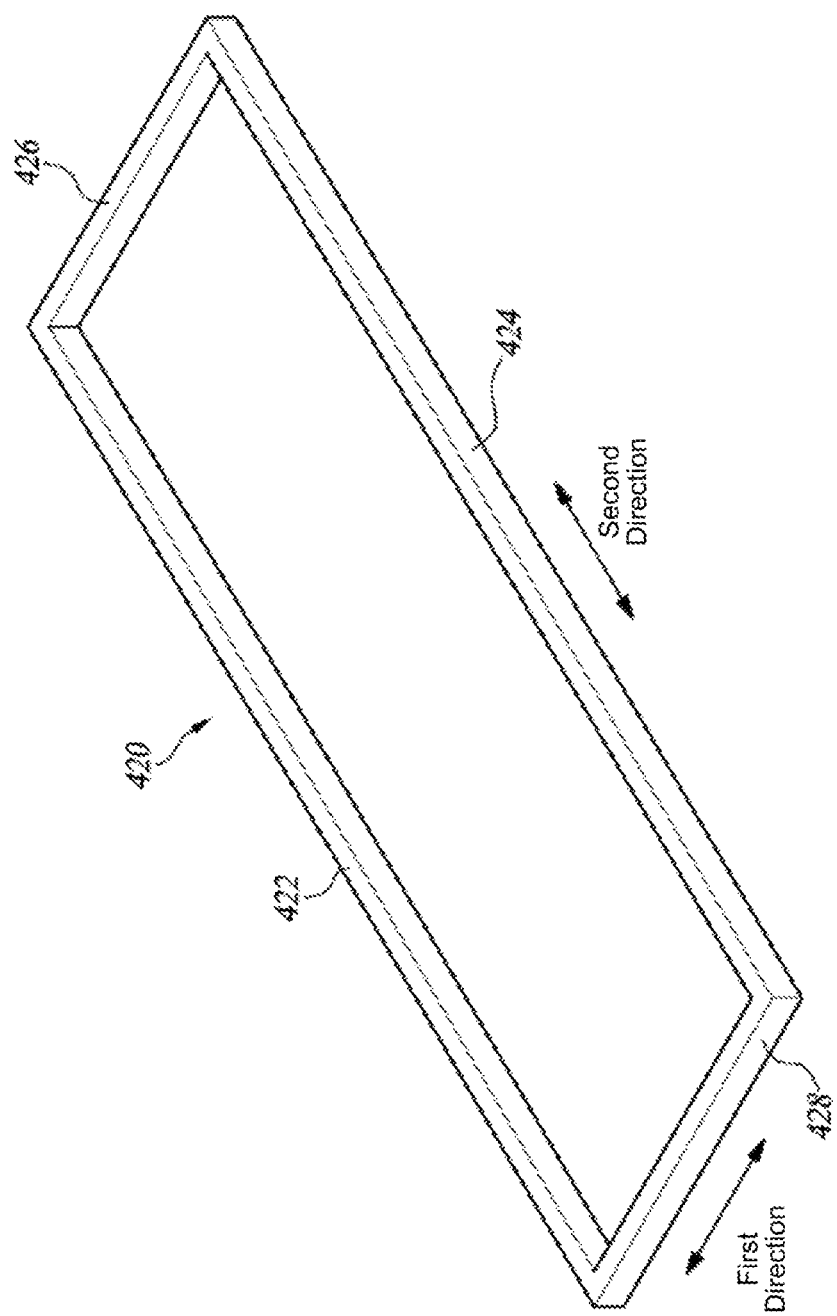
FIG. 6 is a perspective view illustrating a power feeding cable of the wireless power supply apparatus according to the embodiment of the present invention.
Figure 7:
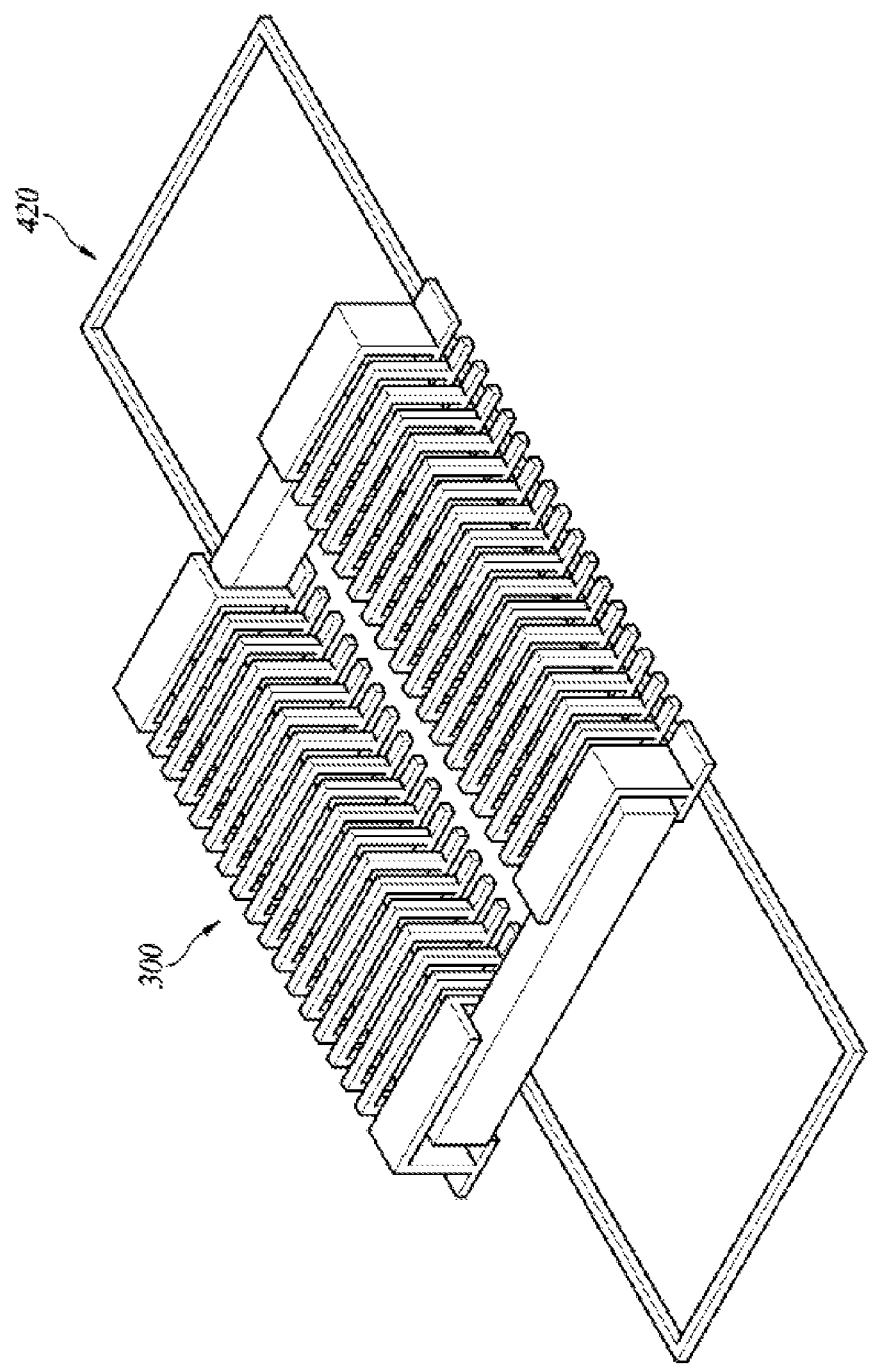
FIG. 7 is a perspective view illustrating the power feeding cable and the power pickup unit of the wireless power supply apparatus according to the embodiment of the present invention.

FIG. 3 is a perspective view illustrating a power pickup unit 300 of the wireless power supply apparatus according to the embodiment of the present invention. FIG. 4 is a perspective view illustrating a power pickup cable 320 of the wireless power supply apparatus according to the embodiment of the present invention. FIG. 5 is a view illustrating power pickup core members 342 and 362 of the wireless power supply apparatus according to the embodiment of the present invention in detail. FIG. 6 is a perspective view illustrating a power feeding cable 420 of the wireless power supply apparatus according to the embodiment of the present invention. FIG. 7 is a perspective view illustrating the power feeding cable 420 and the power pickup unit 300 of the wireless power supply apparatus according to the embodiment of the present invention.

Hereinafter, a configuration and an operation of the wireless power supply apparatus according to the embodiment of the present invention will be described with reference to FIGS. 3 to 7.

The wireless power supply apparatus according to the embodiment of the present invention may include a power pickup unit 300 and a power feeding unit 400. The power pickup unit 300 may include a power pickup core part 330 including a first power pickup core 340 and a second power pickup core 360 and a power pickup cable 320, and the power feeding unit 400 may include a power feeding cable 420.

The power feeding unit 400 may be configured to receive high frequency power from an inverter (not illustrated) connected to the power feeding cable 420, to generate magnetic fluxes, and to deliver the generated magnetic fluxes to the power pickup unit 300, and may be installed on a mad surface (not illustrated) on which vehicles (not illustrated) travel, a railroad surface (not illustrated), or a parking/stopping area (not illustrated), but the present invention is not limited thereto. The feeding cable 420 may include a pair of longitudinal members 422 and 424 and a pair of transverse members 426 and 428. The pair of longitudinal members 422 and 424 may be disposed along a line (not illustrated) on which the vehicle (not illustrated) travels to be spaced apart from each other by a predetermined distance in a direction (hereinafter, "a first direction") that is perpendicular to a lengthwise direction (hereinafter, "a second direction") of the line, and opposite ends of the pair of longitudinal members 422 and 424 may be connected to each other by the pair of transverse members 426 and 428. Although it is described as an example that one power feeding cable 420 is disposed in a description of a configuration and an operation of the wireless power supply apparatus according to the embodiment of the present invention, this is a simple embodiment and a plurality of power feeding cables 420 may be disposed in consideration of the magnitude of electric power required by the wireless power supply apparatus, or the like, or the power feeding cable 420 may be a cable bundle in which a plurality of cables are wounded. Further, although it is described as an example that the cross-section of the feeding cable 420 is rectangular, it is a simple embodiment and the cross-section of the power feeding cable 420 may have various shapes, including a circle, an ellipse, and a polygon.

The power feeding unit 400 provided in the wireless power supply apparatus according to the embodiment of the present invention include a power feeding cable 420, and is configured to generate magnetic fluxes without using a power feeding core and deliver the generated magnetic fluxes to the power pickup unit 300.

Referring to FIG. 7, the power pickup unit 300 may be disposed above the power feeding unit 400 to be magnetically coupled to the power feeding unit 400 while being spaced apart from the power feeding unit 400 by a predetermined interval. The power pickup unit 300 may be mounted under the vehicle (not illustrated) to be movable. In this case, the vehicle (not illustrated) that requires wireless supply of electric power may receive electric power while being stopped at an installation site of the power feeding unit 400, and may continue to receive electric power even while the vehicle (not illustrated) is traveling.

As illustrated in FIG. 4, the power pickup cable 320 may include a pair of first members 322 and 324 and a pair of second members 326 and 328. The pair of first members 322 and 324 are spaced apart from each other in the first direction, and opposite ends of the pair of first members 322 and 324 may be connected to the pair of second members 326 and 328. Connecting portions 323, 325, 327, and 329 are formed between the first members 322 and 324 and the second members 326 and 328. Although it is described as an example that the cross-section of the power pickup cable 320 is rectangular in a description of the configuration and operation of the wireless power supply apparatus according to the embodiment of the present invention, this is a simple embodiment and the cross-section of the power pickup cable 320 may have various shapes, including a circle, an ellipse, and a polygon. The number of disposed power pickup cables 320 may be suitably selected in consideration of the magnitude of electric power required by the wireless power supply apparatus and the size of the power pickup unit. When a plurality of power pickup cables 320 are provided, the power pickup cables 320 may be connected to each other in secures, in parallel, or in a combination form.

As illustrated in FIGS. 3 and 4, the first power pickup core 340 and the second power pickup core 360 may surround the pair of first members 322 and 324, respectively, and may be disposed along the second direction. The first power pickup core 340 may include a plurality of power pickup core members 342 arranged in a row. Further, the first pickup core 340 may include power pickup core members 346 and 348 surrounding at least one connecting portion 323 and 327 of the first member 322 and the second members 326 and 328. Similarly, the second power pickup core 360 may include a plurality of power pickup core members 362 arranged in a row. Further, the second power pickup core 360 may include power pickup core members 366 and 368 surrounding at least one connecting portion 325 and 329 of the first member 324 and the second members 326 and 328.

As illustrated in FIG. 5, although the power pickup core members 342 and 346 may have a stapler-shape to surround the first members 322 and 324, the present invention is not limited thereto but the power pickup core members 342 and 362 may have various shapes, including a C-shape according to occasions. The power pickup core members 342 and 362 may include holding ends 343 and 363 extending from opposite ends of the power pickup core members 342 and 362 in at least one of directions that is perpendicular to a direction in which the power pickup core members 342 and 362 extend. Although the holding ends 343 and 363 may function as supports or may contribute to formation of paths of magnetic fluxes passing through the power pickup core members 342 and 362 when the power core members 342 and 362 are arranged and disposed, the present invention is not limited thereto. Although not illustrated, the power pickup core members 346, 348, 366, and 368 surrounding the connecting portions 323, 325, 327, and 329 may also include holding ends 343 and 363. Although it is described as an example that the cross-sections of the power pickup core members 342, 362, 346, 348, 366, and 368 have a rectangular shape in a description of the configuration and operation of the wireless power supply apparatus according to the embodiment of the present invention, this is a simple embodiment, and the cross-sections of the power pickup core members 342, 362, 346, 348, 366, and 368 may have various shapes, including a circle, an ellipse, and a polygon if necessary. Although the material of the power pickup core members 342, 362, 346, 348, 366, and 368 may be ferrite that may easily form a magnetic field due to an electromagnetic induction phenomenon, the present invention is not limited thereto.

Referring to FIGS. 3 and 4, the power pickup core members 346 and 348 may extend in the second direction to surround upper sides of the connecting portions 323 and 327 of the first member 322 and the second members 326 and 328. Although the length by which the power pickup core members 346 and 348 extend in the second direction may be the same as the thickness or diameter of the second members 326 and 328, the present invention is not limited thereto but the length of the extensions may be suitably selected if necessary. Similarly, the power pickup core members 366 and 368 may extend in the second direction to surround upper sides of the connecting portions 325 and 329 of the first member 324 and the second members 326 and 328. Although the length by which the power pickup core members 366 and 368 extend in the second direction may be the same as the thickness or diameter of the second members 326 and 328, the present invention is not limited thereto but the length of the extensions may be suitably selected if necessary. Although not illustrated, the power pickup core members 346, 348, 366, and 368 may extend to surround a side surface of at least one connecting portions 323, 325, 327, and 329 corresponding to the second direction.

As described above, because the power feeding unit 400 of the wireless power supply apparatus delivers magnetic fluxes only with the power feeding cable 420 without using a power feeding core, price competitiveness may be increased by reducing enormous material costs consumed to manufacture a power feeding core and the wireless power supply apparatus may be simply installed by reducing the weight and volume thereof.

Further, because the power pickup cores 340 and 360 include a plurality of power pickup core members 342, 346 348, 362, 366, and 368, the weight and volume of the power pickup cores 340 and 360 may be reduced as compared with an E-shaped power pickup core conventionally invented by KAIST so that it is expected that the driving efficiency of the vehicle, under which the power pickup unit is mounted, will be increased.

Figure 8:
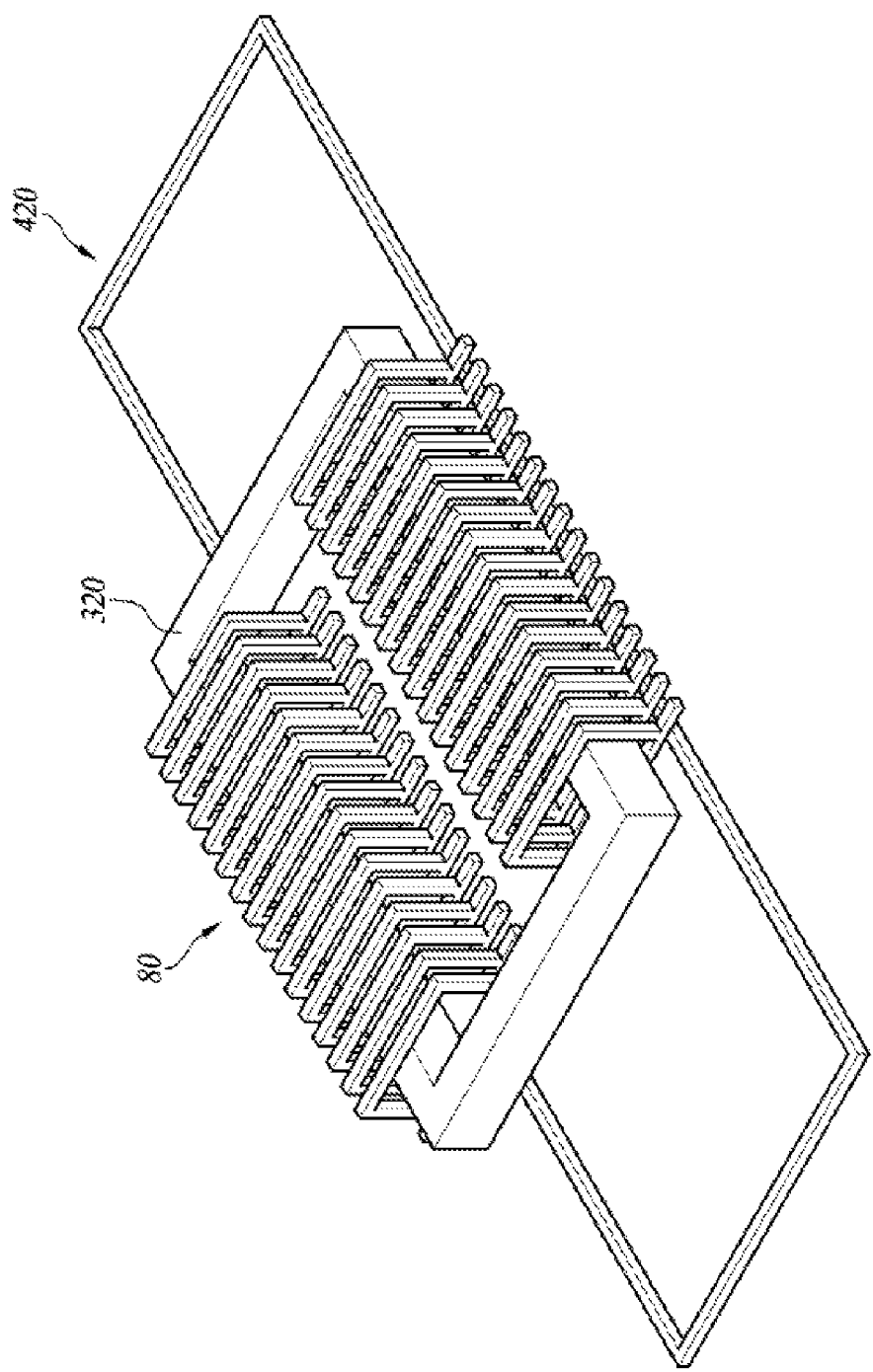
FIG. 8 is a view for comparing a power pickup performance of the wireless power supply apparatus according to the embodiment of the present invention.
Figure 9:
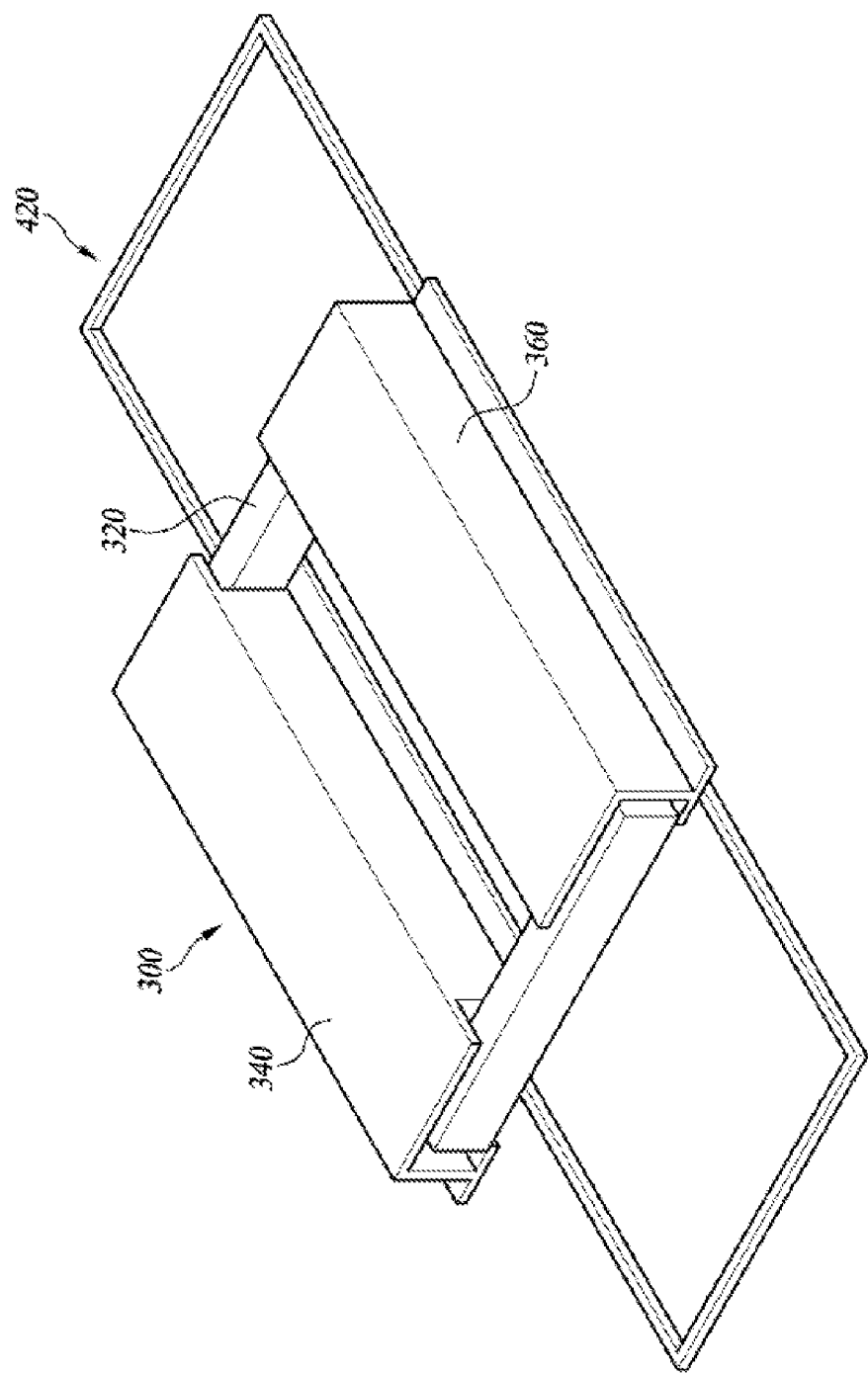
FIG. 9 is a perspective view illustrating the power feeding unit and the power pickup unit including a power pickup core part having an integral cover, of the wireless power supply apparatus according to the embodiment of the present invention.
Figure 10:
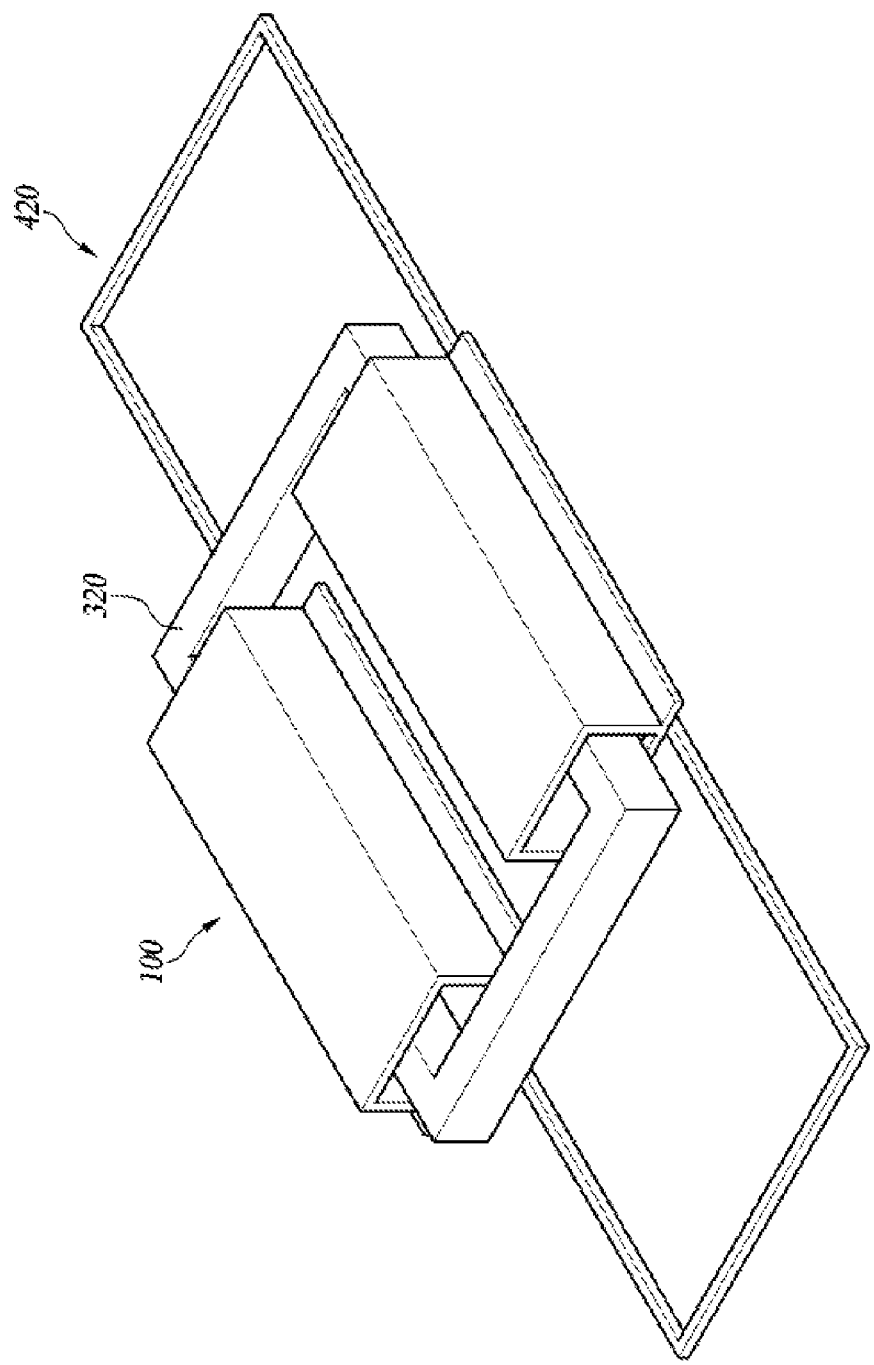
FIG. 10 is a view for comparing power pickup performance when the power pickup core part of the wireless power supply apparatus according to the embodiment of the present invention has the integral cover.

FIG. 8 is a view for comparing a power pickup performance of the wireless power supply apparatus according to the embodiment of the present invention. FIG. 9 is a perspective view illustrating the power feeding unit 400 and the power pickup unit 300 including a power pickup core part 330 having an integral cover, of the wireless power supply apparatus according to the embodiment of the present invention. FIG. 10 is a view for comparing power pickup performance when the power pickup core part 300 of the wireless power supply apparatus according to the embodiment of the present invention has the integral cover.

Hereinafter, the power pickup performance of the wireless power supply apparatus according to the embodiment of the present invention will be compared with reference to FIGS. 7 to 10.

According to the experimental result, the voltage of the inductive electromotive force induced in the power pickup unit 300 of the wireless power supply apparatus of FIG. 7 according to the embodiment of the present invention is 11.539 kV (a peak value) and was higher than the voltage of 8.37 kV (a peak value) of the inductive electromotive force induced in the power pickup unit 20 of the conventional wireless power supply apparatus of FIG. 1. As can be seen from the experimental result, the voltage of the electromotive force induced in the power pickup unit 300 of the wireless power supply apparatus according to the embodiment of the present invention increases to be higher than the voltage of the inductive electromotive force induced in the power pickup unit 20 of the conventional wireless power supply apparatus of FIG. 1.

As illustrated in FIG. 8, the voltage of the inductive electromotive force included in the power pickup unit 80 that does not include the power pickup core members 346, 348, 366, and 368 surrounding the connecting portions 323, 325, 327, and 329 of the first members 322 and 324 and the second members 326 and 328 was 9.76 kV (a peak value).

That is, as illustrated in FIG. 7, because the power pickup unit 300 includes the power pickup core members 346, 348, 366, and 368 surrounding the connecting portions 323, 325, 327, and 329 of the first members 322 and 324 and the second members 326 and 328, it could be identified that induced electromotive force was increased as compared with the power pickup unit 80 of FIG. 8 that does not include the power pickup core members 346, 348, 366, and 368 surrounding the connecting portions 323, 325, 327, and 329 of the first members 322 and 324 and the second members 326 and 328.

In the wireless power supply apparatus of FIG. 9, the power pickup unit 300 of the wireless power supply apparatus according to the embodiment of the present invention does not include the plurality of power pickup core members 342, 362, 346, 348, 366, and 368 but includes first and second power feeding cores 340 and 360 integrally formed to surround the connection portions 323, 325, 327, and 329 of the first members 322 and 324 and the second members 326 and 328, and in this case, it can be seen that the voltage of the induced electromotive force included in the power pickup unit 300 is 11.540 kV (a peak value), and is higher than the voltage of 8.37 kV (a peak value) of the inductive electromotive force induced in the power pickup unit 20 of the conventional wireless power supply apparatus of FIG. 1 and is slightly higher than the electromotive force of the case in which the power pickup unit includes the plurality of power pickup core members 342, 362, 346, 348, 366, and 368 of FIG. 7.

As illustrated in FIG. 10, the voltage of the electromotive force induced in the power pickup unit 100 that does not surround the connection portions 323, 325, 327, and 329 of the first members 322 and 324 and the second members 326 and 328 was 10.137 kV (a peak value). That is, as illustrated in FIG. 9, it may be seen that because the power pickup unit 300 surrounds the connecting portions 323, 325, 327, and 329 of the first members 322 and 324 and the second members 326 and 328, induced electromotive force may be increased as compared with the case in which the power pickup unit 100 does not surround the connecting portions 323, 325, 327, and 329 of the first members 322 and 324 and the second members 326 and 328 as illustrated in FIG. 10.

As described above, it may be seen that the voltage induced in the power pickup unit of FIG. 7 including a plurality of power pickup core members is substantially the same as the voltage induced in the integrally formed power pickup unit of FIG. 9. It can be seen that the voltage induced in the power pickup unit of FIG. 7 is not different from the voltage induced in the power pickup unit of FIG. 9 while the amount of the material consumed to form a core is remarkably reduced. This is an effect that may be obtained by forming the power pickup unit of the wireless power supply apparatus according to the embodiment of the present invention such that the power pickup unit surrounds the connecting portions of the first members and the second members.

Figure 11:
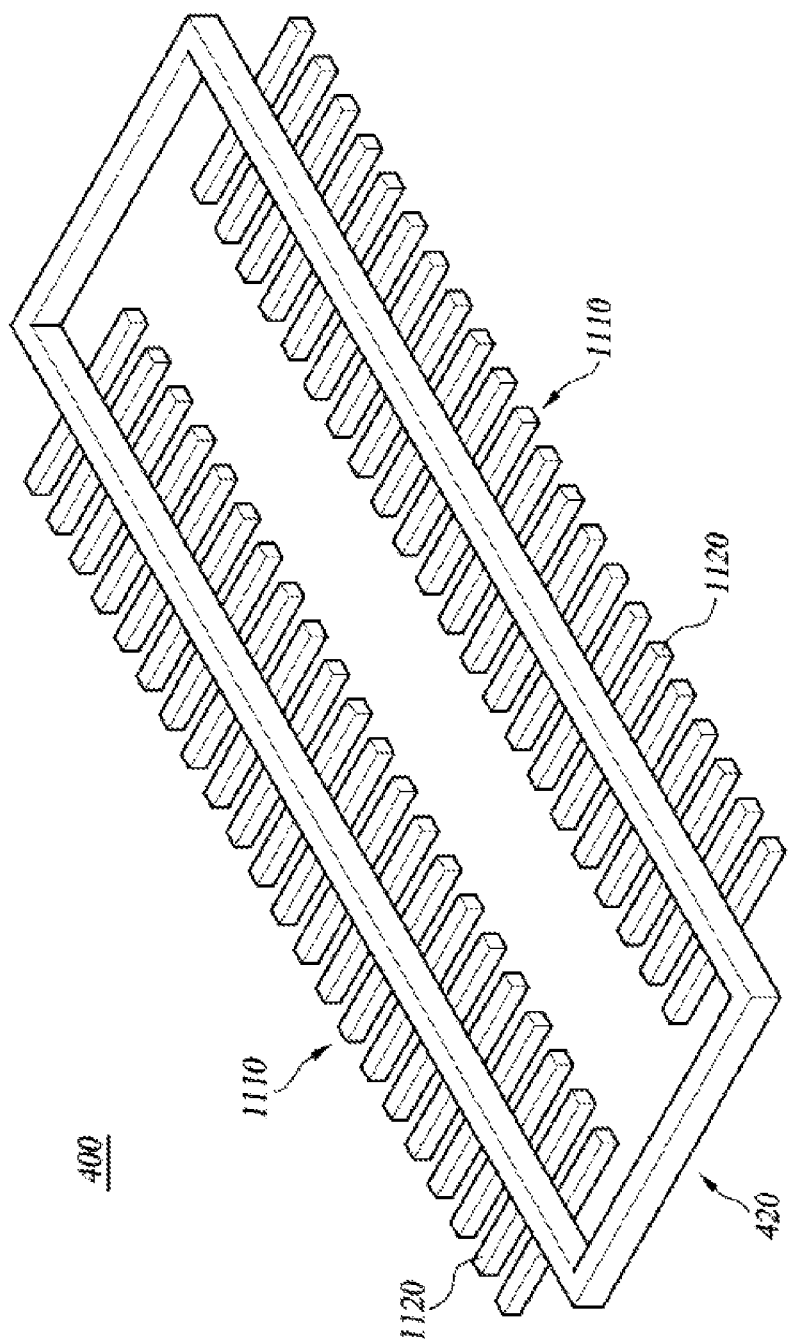
FIG. 11 is a perspective view illustrating a case in which the power feeding unit of the wireless power supply apparatus according to the embodiment of the present invention includes a power feeding core part having a bar type power feeding core.
Figure 12:
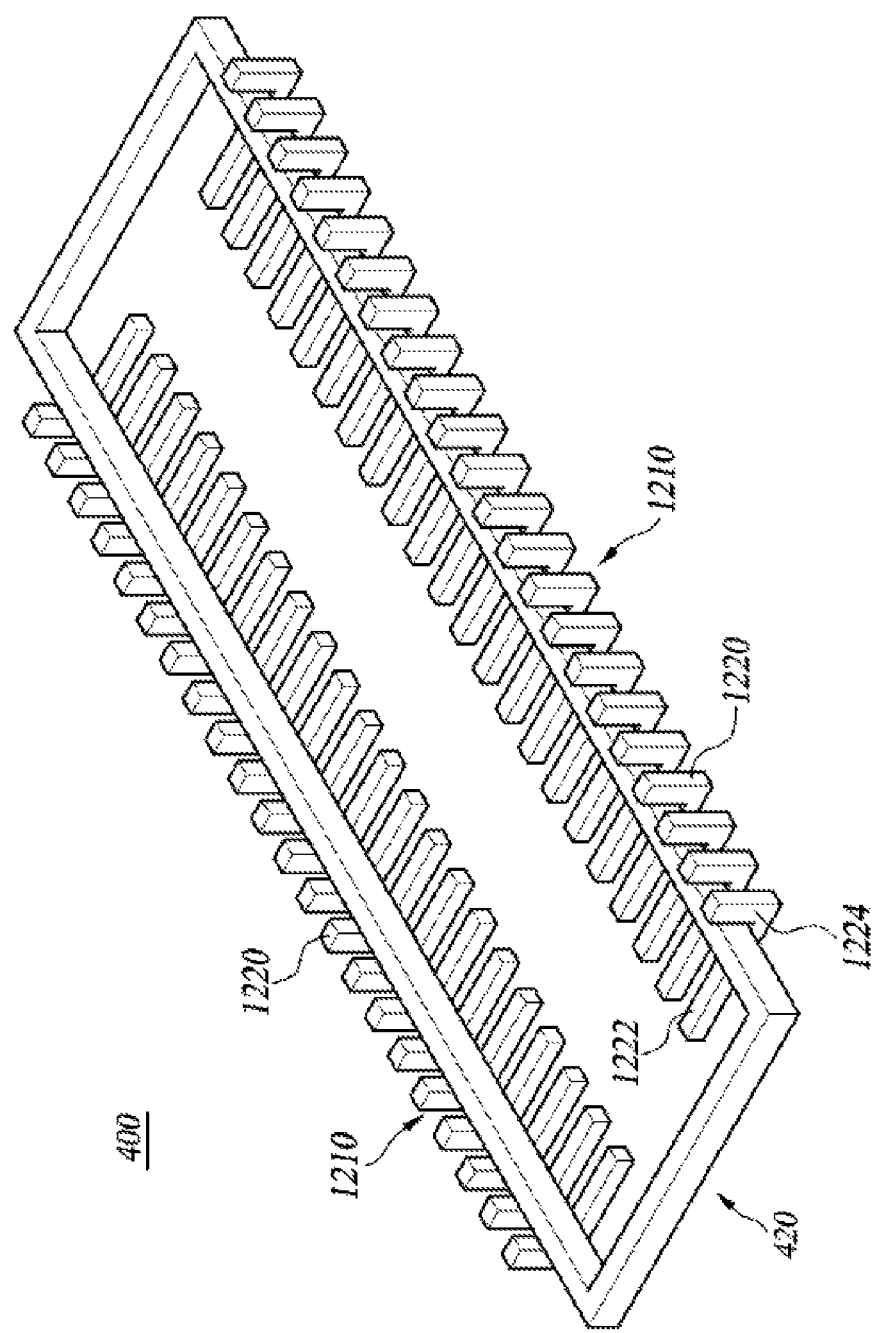
FIG. 12 is a perspective view illustrating a case in which the power feeding unit of the wireless power supply apparatus according to the embodiment of the present invention includes a power feeding core part including an L-shaped power feeding core.

FIG. 11 is a perspective view illustrating a case in which the power feeding unit 400 of the wireless power supply apparatus according to the embodiment of the present invention includes a power feeding core part 1110 having a bar type power feeding core 1120. FIG. 12 is a perspective view illustrating a case in which the power feeding unit 400 of the wireless power supply apparatus according to the embodiment of the present invention includes a power feeding core part 1210 including an L-shaped power feeding core 1220.

As illustrated in FIG. 11, the power feeding unit 400 may include a power feeding core part 1110 including a plurality of pairs of bar-shaped power feeding cores 1120 arranged in a predetermined direction and disposed in parallel to each other to be spaced apart from each other by a predetermined width. Each of the bar-shaped power feeding cores 1120 has a bar shape having a predetermined length as a whole when viewed in the second direction. The bar-shaped power feeding cores 1120 are disposed in a direction that is parallel to the bottom of a mad surface (not illustrated), a railroad surface (not illustrated), or a parking/stopping area (not illustrated). As illustrated in FIG. 11, although it is described as an example that the cross-section of the bar-shaped power feeding cores 1120 is rectangular, this is a simple embodiment and the cross-section of the bar-shaped power feeding cores 1120 may have various shapes, including a circle, an ellipse, and a polygon. Although it is preferable that the material of the bar-shaped power feeding cores 1120 is ferrite that easily forms a magnetic field by an electromagnetic induction phenomenon, the present invention is not limited thereto.

The power feeding cores having bar-shaped magnetic field forming parts form magnetic fields in a smaller range as compared with the E-shaped power feeding cores. This is because as the size of the structure of the magnetic field forming part is relatively small and the length is minimized such that a first lengthwise end and a second lengthwise end thereof, from which magnetic fields are mainly formed, are located close to each other, the spatial distance of the magnetic fields formed between the end and the second end becomes shorter.

Because the bar-shaped power feeding cores 1120 may have a small volume and a simple structure as compared with the E-shaped power feeding cores, spatial efficiency may be increased and manufacturing costs may be reduced. Further, the above-described wireless power supply apparatus may efficiently supply electric power between the power feeding cores and the power pickup cores even though the distance between the power feeding cores and the power pickup cores is relatively far.

Further, as illustrated in FIG. 12, the power feeding unit 400 may include a power feeding core part 1210 including a plurality of pairs of L-shaped power feeding cores 1220 arranged in a predetermined direction and disposed in parallel to be spaced apart from each other by a predetermined width. Each of the L-shaped power feeding cores includes a horizontal member 1222 disposed parallel to the bottom of road surface (not illustrated), a railroad surface (not illustrated), or a parking/stopping area (not illustrated) and a vertical member 1224 extending in a direction that is perpendicular to one end of the horizontal member 1222 to have an L shape. Although it is preferable that the length of the horizontal members 1222 is larger than the length of the vertical members 1224 and the vertical members 1224 are located at widthwise peripheries of the L-shaped power feeding cores 1120, the present invention is not limited thereto. As illustrated in FIG. 12, although it is described as an example that the cross-section of the L-shaped power feeding cores 1220 is rectangular, this is a simple embodiment and the cross-section of the L-shaped power feeding cores 1220 may have various shapes, including a circle, an ellipse, and a polygon if necessary. Although the material of the L-shaped power feeding cores 1220 may be ferrite that may easily form a magnetic field due to an electromagnetic induction phenomenon, the present invention is not limited thereto. Further, although it is preferable that the feeding cable 420 is located above the horizontal members 1222 and is disposed adjacent to the vertical members 1224, the present invention is not limited thereto.

The L-shaped power feeding cores 1220 have a shorter magnetic path length as compared with the bar-shaped power feeding cores 11. The magnetic fluxes of the magnetic field formed in the small range are damped to a small degree. It is because the magnetic flux is damped in a larger range as the MPL becomes larger. The magnetic fluxes of the power feeding cores of the wireless power supply apparatus according to the embodiment of the present invention are damped in a small range, loss of the cores may be reduced during wireless feeding and a relatively high induced voltage may be obtained as compared with the wireless power supply apparatus of another structure.

Because the L-shaped power feeding cores 1220 have a relatively simple structure, they may be easily manufactured and manufacturing costs may be saved, and in particular, because the volume of the power feeding cores is small, the entire wireless power supply apparatus is spatially restricted in a small range.

Figure 13:
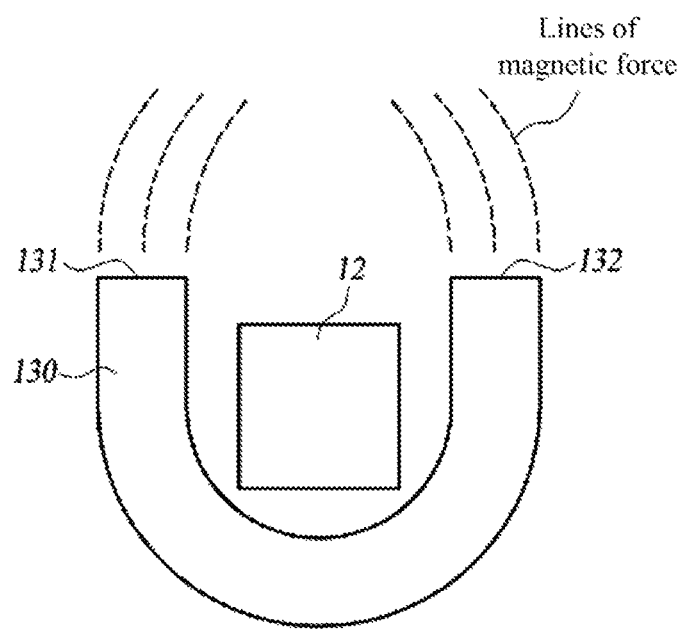
FIG. 13 is a view illustrating a C-shaped power feeding core part 15 in detail.

FIG. 13 is a view illustrating a C-shaped power feeding core part 15 in detail.

A pair of power feeding core parts 15 in which a plurality of C-shaped magnetic forming parts 130 are arranged in a predetermined direction and which are disposed in parallel to be spaced apart from each other by a predetermined width is provided, and the pair of power feeding part generates a magnetic field, a direction of which changes periodically as a phase of received AC power changes. Here, each of the magnetic field forming parts has a semi-cylindrical shape including a first section 131 and a second section 132 obtained by cutting a cylinder in a radial direction thereof, a magnetic field, a direction of which changes between the first section 131 and the second section 132 as the phase of the AC power supplied changes is generated, and a least a portion of the magnetic field is formed between the first section 131, and the body of the magnetic field forming part 130 and the second section 132.

The range of the magnetic fields formed by the power feeding core part in which the C-shaped magnetic field forming parts 130 of the present invention are arranged is small as compared with the power feeding core part of another form. This is because the size of the structure of the magnetic field forming part 130 is relatively small and the spatial distance of the magnetic field formed between the first section 131 and the second section 132 becomes shorter as the first section 131 and the second section 132 in which the magnetic fields are mainly formed is located close to each other.

The magnetic flux of the magnetic field formed in the small range is damped in a small range. This is because the magnetic flux may be damped in a larger range as the spatial distance of the magnetic field becomes larger. Because the magnetic flux of the power feeding core part of the present invention is damped in a small range, power loss may be reduced during wireless feeding and an electromotive force of a relatively high current and a relatively high voltage may be obtained as compared with the wireless power supply apparatus of another structure. Further, because the power feeding core parts of the present invention have a simple structure as compared with the power feeding cores of another structure, they may be easily manufactured and manufacturing costs may be saved, and in particular, because the volume of the power feeding core parts is small, the entire wireless power supply apparatus is spatially restricted in a smaller range. Further, because a range of the magnetic field according to the present invention is small as a whole, a harmful influence on a human body due to an EMF, a breakdown or a malfunction of an electronic device may be reduced by reducing a range of the EMF.

In this way, an magnetic path length (MPL) may be reduced by using the bar-shaped, the L-shaped, or the C-shaped power feeding cores of FIGS. 11 to 13 in the power feeding core parts 15, and thus core loss may be reduced.

Even though it has been described until now that all the elements constituting the embodiments of the present invention are coupled into one or coupled to each other to be operated, the present invention is not necessarily limited to the embodiments. That is, without departing from the purpose range of the present invention, all the elements may be selectively coupled into one or more to be operated.

The above description is a simple example of the technical spirit of the present invention, and the present invention may be variously corrected and modified by those skilled in the art to which the present invention pertains without departing from the characteristics of the present invention. Accordingly, the embodiments disclosed in the present invention are provided not to limit but to explain the technical spirit of the present invention, and the scope of the technical spirit of the present invention is not limited by the embodiments. The scope of the present invention should be construed by the claims and all the equivalent technical spirits should be construed to be included in the scope of the present invention.

DESCRIPTION OF REFERENCE NUMERALS

130: Magnetic field forming part
131: First section
132: Second section
15: C-shaped power feeding core
300: Power pickup unit
320: Power pickup cable
330: Power pickup core part
340: First power pickup core
360: Second power pickup core
342, 362: Power pickup core member
400: Power feeding unit
420: Power feeding cable
1110, 1210: Power feeding core part
1120: Bar-shaped power feeding core
1220: L-shaped power feeding core

CROSS-REFERENCE TO RELATED APPLICATION

This application claims priority to Korean Patent Application No. 10-2014-0109235, filed on Aug. 21, 2014, the contents of which are hereby incorporated by reference in their entireties according to 35 U.S.C 119(a). The patent application also may be incorporated by reference in their entireties in nations other than the United States of America.

The invention claimed is:

1. A power pickup unit of a wireless power supply apparatus for wirelessly supplying electric power, comprising:
a power pickup cable including a pair of first members spaced apart from each other in a first direction and a pair of second members connecting opposite ends of the first members; and
a power pickup core part including a pair of power pickup cores disposed along a second direction that is perpendicular to the first direction to surround the pair of first members, respectively,
wherein said a pair of power pickup cores is configured to surround at least one connecting portion formed by the pair of first members of the power pickup cable and the pair of second members of the power pickup cable.

2. The power pickup unit of a wireless power supply apparatus of claim 1, wherein each of said a pair of power pickup cores comprises a plurality of power pickup core members arranged in a row.

3. The wireless power supply apparatus of claim 2, wherein at least one power pickup core member of said a plurality of power pickup core members surrounds the corresponding first member of said a pair of first members of the power pickup cable, and at least another one power pickup core member of said a plurality of power pickup core members surrounds said at least one connecting portion.

4. The power pickup unit of a wireless power supply apparatus of claim 3, wherein said at least another one power pickup core member of said a plurality of power pickup core members surrounds said at least one connecting portion from the top.

5. The power pickup unit of a wireless power supply apparatus of claim 2, wherein each of said a plurality of power pickup core members comprises a holding end extending from at least one of directions that are perpendicular to an extension direction of the power pickup core member at opposite ends of the power pickup core member.

6. The power pickup unit of a wireless power supply apparatus of claim 5, wherein the holding ends provided in the power pickup core members of said a pair of power pickup cores are spaced apart from each other by a predetermined distance.

7. The power pickup unit of a wireless power supply apparatus of claim 1, wherein at least one power pickup core of said a pair of power pickup cores surrounds the corresponding first member of said a pair of first members of the power pickup cable and one end thereof extends in the second direction to surround said at least one connecting portion.

8. The power pickup unit of a wireless power supply apparatus of claim 7, wherein said one end of said at least one power pickup core of said a pair of power pickup cores extends from the top of said at least one connecting portion.

9. The power pickup unit of a wireless power supply apparatus of claim 7, wherein said at least one power pickup core of said a pair of power pickup cores surrounds at least one of sides of said at least one connecting portion in the second direction.

10. The power pickup unit of a wireless power supply apparatus of claim 1, wherein comprises a plurality of said power pickup cables.

11. A wireless power supply apparatus comprising:
the power pickup unit of claim 1; and
a power feeding cable delivering a magnetic flux without using a power feeding core.

12. A wireless power supply apparatus comprising:
the power pickup unit of claim 1;
a pair of power feeding core parts in which a plurality of bar-shaped power feeding cores are arranged in a predetermined direction and which are disposed in parallel to be spaced apart from each other by a predetermined width; and
a power feeding cable disposed in the power feeding core parts.

13. A wireless power supply apparatus comprising:
the power pickup unit of claim 1;
a pair of power feeding core parts in which a plurality of bar-shaped power feeding cores are arranged in a predetermined direction and which are disposed in parallel to be spaced apart from each other by a predetermined width; and
a power feeding cable disposed in the power feeding core parts,
wherein each of the power feeding cores comprises a horizontal member disposed parallel to a plane formed by the power feeding core parts and a vertical member extending in a direction that is perpendicular to the horizontal member to have an L shape.

14. A wireless power supply apparatus comprising:
the power pickup unit of claim 1;
a pair of power feeding core parts in which a plurality of C-shaped magnetic forming parts are arranged in a predetermined direction and which are disposed in parallel to be spaced apart from each other by a predetermined width, the pair of power feeding core parts being configured to generate a magnetic field, a direction of which changes periodically as a phase of received AC power changes; and
a power feeding cable disposed in the power feeding core parts.

* * * * *